United States Patent
Murai et al.

(10) Patent No.: US 6,172,776 B1
(45) Date of Patent: *Jan. 9, 2001

(54) METHOD AND APPARATUS FOR PROCESSING A COLOR IMAGE

(75) Inventors: Kazumasa Murai; Hitoshi Ogatsu, both of Ebina (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/771,143

(22) Filed: Dec. 20, 1996

(30) Foreign Application Priority Data

Dec. 28, 1995 (JP) .................................. 7-342886

(51) Int. Cl.[7] ................................................. G03F 3/08
(52) U.S. Cl. .................. 358/529; 358/515; 358/518; 382/162; 382/167
(58) Field of Search .................. 358/529, 500, 358/520; 382/162, 167

(56) References Cited

U.S. PATENT DOCUMENTS

| | | | |
|---|---|---|---|
| 4,700,399 | * 10/1987 | Yoshida | 382/167 |
| 4,831,409 | * 5/1989 | Tatara et al. | 347/115 |
| 5,008,742 | * 4/1991 | Shigaki et al. | 358/529 |
| 5,084,762 | * 1/1992 | Miyakawa | 358/529 |
| 5,359,436 | * 10/1994 | Dichter et al. | 358/500 |
| 5,636,290 | * 6/1997 | Kita et al. | 382/167 |

FOREIGN PATENT DOCUMENTS

| | | | |
|---|---|---|---|
| 5-292306 | 11/1993 | (JP) | 358/529 |
| 7-087347 | 3/1995 | (JP) . | |

* cited by examiner

Primary Examiner—Leo H Boudreau
Assistant Examiner—Gregory Desiré
(74) Attorney, Agent, or Firm—Oliff & Berridge, PLC

(57) ABSTRACT

Device independent color signals in color coordinates of the calorimetric system are computed using the color signals Ci, Mi, Yi, Ki in first CMYK coordinates. A maximum quantity of black maxKi of the color signals Ci, Mi, Yi, Ki is computed by using the color signals Ci, Mi, Yi, Ki and the device independent color signals. A black ratio g of the color signals Ci, Mi, Yi, Ki is computed using the maximum black quantity maxKi and the color signal Ki. A maximum quantity of black that can be obtained without changing the device independent color signals is computed using the device independent color signals. The color signal Ko in second CMYK coordinates is determined by the maximum black quantity and the black ratio, and the color signals Co, Mo, Yo, Ko in the CMYK coordinates are determined by using the device independent color signals and the color signal Ko.

22 Claims, 8 Drawing Sheets

METHOD AND APPARATUS FOR PROCESSING A COLOR IMAGE

BACKGROUND OF THE INVENTION

1. Field of the Invention

The present invention relates to a method and apparatus for processing a color image. More particularly, the invention relates to a method which is capable of converting color signals in color coordinates of colors C (cyan), M (magenta), Y (yellow), K (black) to corresponding ones in another color coordinates while keeping invariable the calorimetric values and a black-ink ratio, and an apparatus for executing the method.

2. Discussion of the Related Art

A color management system (CMS) secures the consistency of colors in different color image input/output devices by properly managing colors. The CMS or a color facsimile converts different input color signals C, M, Y, K to calorimetric values, and converts again these calorimetric values to the output color signals C, M, Y, K. In this way, the calorimetric coincidence of the input color signals with the reproduced color signals is secured.

In the color signals C, M, Y, K, colors are expressed a four-dimensional manner, while the calorimetric values are expressed a three-dimensional manner. Accordingly, the calorimetric values can be uniquely determined by the input color signals C, M, Y, K, but the color signals C, M, Y, K cannot be uniquely determined by the calorimetric values. For this reason, the conventional art generates the color signals C, M, Y, K in the following manner.

Tentative color signals C, M, Y, K are uniquely determined on the basis of the calorimetric values. The minimum values of the color signals C, M, Y are selected from among those tentative color signals C, M, Y, K, and used as the maximum quantity of black ink or key (referred to as "black"). The maximum quantity of black is multiplied by a proper black ratio to thereby form a black print or determine a value of the signal K. Color signals C, M, Y, K that are calorimetrically equivalent to the input ones are generated by using the thus obtained signal K.

In reproducing black by using color signals C, M, Y, K, when a case where color signals C, M, Y are set at 100% and the signal K is 0% (process black) is compared with another case where color signals C, M, Y are set at 0% and the signal K is 100% (single color of black), the colorimetric values in the first case are substantially equal to those in the second case. However, other parameters, e.g., gloss, than the colorimetric values in the first case are different from those in the second case. For example, it is desirable to express a black character by a single color of black. However, it is undesirable to express a black part in a color photograph by a single color of black.

Such information at the time of color separation which are those other than the calorimetric values, are contained in the color signals C, M, Y, K. When the color signals are converted into colorimetric values as in the CMS, other information than the calorimetric values are lost. Thus, the conventional art cannot reproduce an image having the same texture as of the original image. The information at the time of color separation can be retained if gradation levels of each single color are corrected without converting the colors. In this case, it is impossible to form the output colors which are calorimetrically equal to the input colors, however.

SUMMARY OF THE INVENTION

Accordingly, an object of the present invention is to provide a method and apparatus for processing a color image which can solve the above problems.

To achieve the above object, in the present invention, device independent color signals in color coordinates of the colorimetric system are computed using the color signals Ci, Mi, Yi, Ki on first color coordinates of colors C, M, Y, K (referred to as CMYK coordinates). A maximum quantity of black maxKi of the color signals Ci, Mi, Yi, Ki is computed using the color signals Ci, Mi, Yi, Ki and the device independent color signals. A black ratio g of the color signals Ci, Mi, Yi, Ki is computed using the maximum black quantity maxKi and the color signal Ki.

In another mode of the invention, a maximum black quantity maxKo that can be obtained by computing the maximum value of black which secures the device independent color coordinate provided that Co, Mo, Yo are adjusted. A black ratio g attached to the device independent color signals is recognized. A color signal Ko on the CMYK coordinates is determined by the maximum black quantity maxKo and the black ratio g. The color signals Co, Mo, Yo, Ko on CMYK coordinates are determined by the device independent color signals and the color signal Ko.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Embodiments of the present invention will be described with reference to the accompanying drawings.

(First Embodiment)

Figure 1:
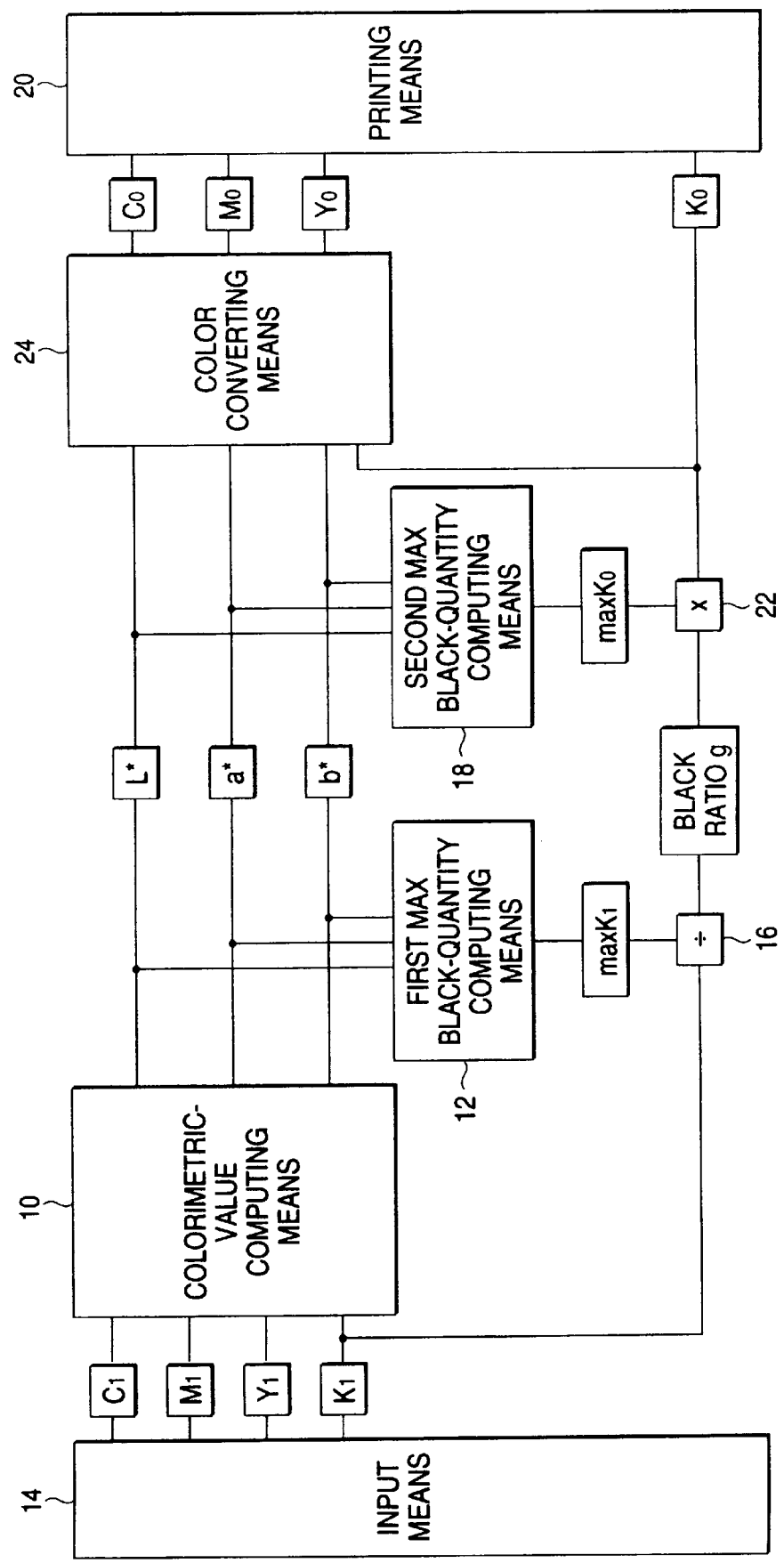
FIG. 1 is a block diagram showing a first embodiment of the present invention.

FIG. 1 is a block diagram showing a first embodiment of the present invention. In FIG. 1, input means 14 is provided for inputting color signals Ci, Mi, Yi, Ki on first CMYK coordinates. A colorimetric-value computing means 10 converts input color signals Ci, Mi, Yi and Ki to colorimetric values $L^*$, $a^*$, $b^*$ based on the device characteristics of the input means 14. The calorimetric values $L^*$, $a^*$, $b^*$ are color signals in colorimetric system coordinates, which are independent of the characteristics of the color image processing device. The colorimetric-value computing means 10 may be constructed using a neural network.

If colorimetric values $L^*$, $a^*$, $b^*$ and any of colors C, M, Y, K are known, one can know whether or not the colorimetric values can be reproduced. A first maximum black-quantity computing means 12 judges whether or not known calorimetric values $L^*$, $a^*$, $b^*$ can be reproduced with provided black quantity K while varying a black quantity K between 0% to 100%. A maximum quantity maxKi of black within a range within which color may be reproduced is computed on the basis of the result of the judgement. For computing the maximum black quantity, a dichotomy, a binary search method or the like may be used.

A dividing means 16 divides an input black quantity Ki by a maximum black quantity maxKi to produce a black ratio g. A second maximum black quantity computing means 18 computes a maximum quantity maxKo of black in a second 4-color space, i.e. C, M, Y, K coordinate of the printing means 20, using the calorimetric values L*, a*, b*. A multiplying means 22 multiplies the maximum black quantity maxKo by the black ratio g to output a black signal Ko in the coordinates of the colors C, M, Y, K.

The remaining three colors can be determined by using the calorimetric values L*, a*, b* and any of four colors C, M, Y, K. Those three colors may be determined by using a color reproduction model method based on a continuous function, a computer color matching (CCM) method, a steepest descending method, or the like. The CCM method approaches to a solution by a successive approximation or a Newtonian method, and the steepest descending method successively approaches to a solution while appropriately seeking an optimum direction.

A color converting means 24 computes the colorimetric values L*, a*, b* and a second black signal Ko by the steepest descending method, to thereby produce colors Co, Mo, Yo, Ko in second coordinates of the colors C, M, Y, K. The colorimetric values and the black ratio of the color signals Co, Mo, Yo, Ko are equal to the corresponding ones of the color signals Ci, Mi, Yi, Ki in the first CMYK coordinates. A printing means 20 prints out an image in accordance with the color signals Co, Mo, Yo, Ko.

Figure 2:
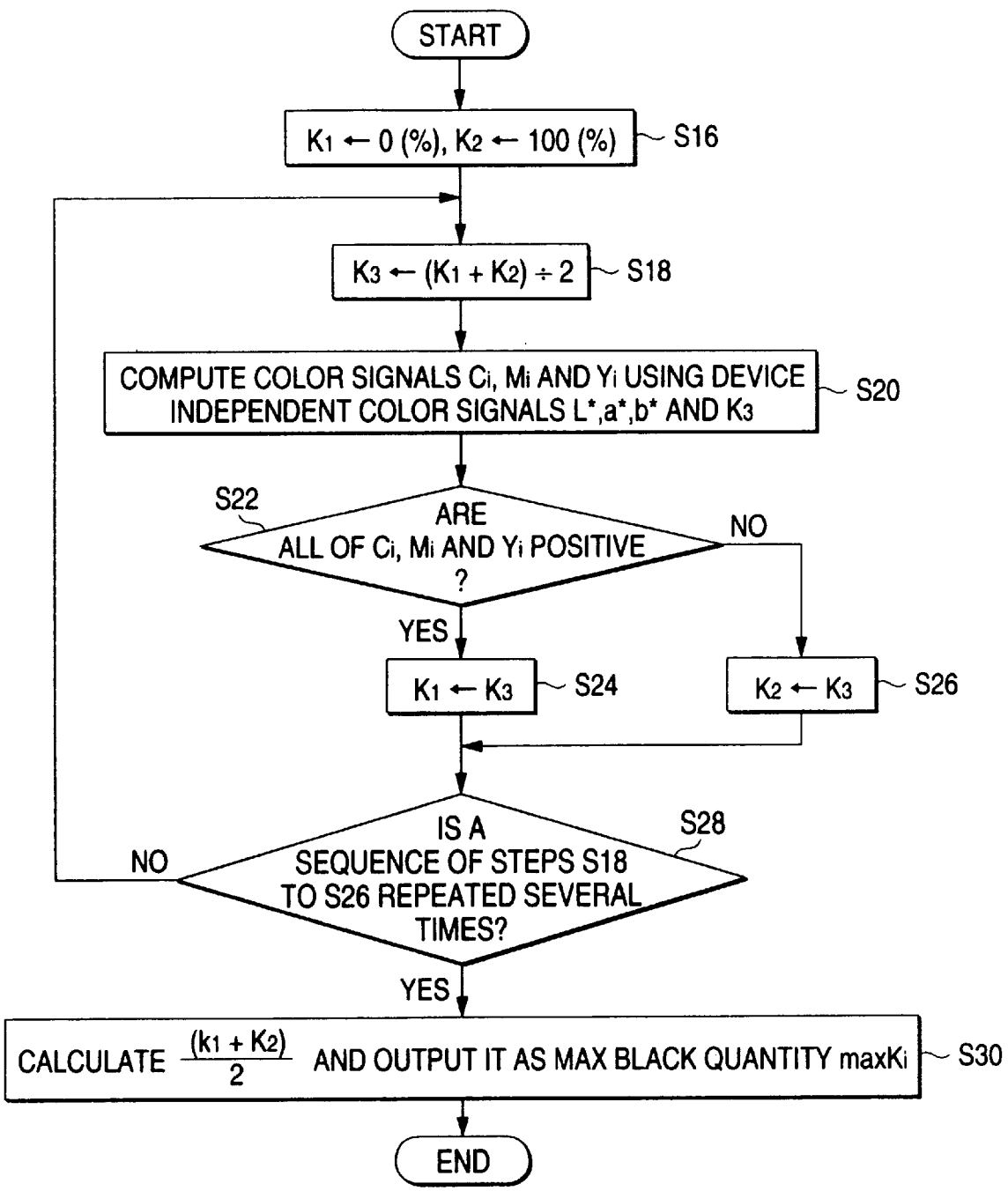
FIG. 2 is a flow chart showing an operation of a first maximum black quantity computing means 12 in FIG. 1.

FIG. 2 is a flow chart showing an operation of the first maximum black-quantity computing means 12. Constants K1 and K2 representative of the upper and lower limits of the color K are set to 0% and 100%, respectively (step S16). An intermediate value K3 between the constants K1 and K2 is computed (step S18). Color signals Ci, Mi, Yi are computed using color signals L*, a*, b* independent of the characteristics of the device and the intermediate value K3 (step S20).

If all the color signals Ci, Mi, Yi are positive (step S22), maxKi>K3 and then K3 is set to the lower limit K1 (step S24). If any of the color signals Ci, Mi, Yi are not positive (step S22), maxKi<K3 and then K3 is set to the upper limit K2 (step S26). A sequence of steps S18 to S26 is repeated several times (step S28), and thereafter the constants K1 and K2 are averaged and the average value is output as a maximum black quantity maxKi (step S30). Here, the process executed by the maximum black quantity computing means ends.

Figure 3:
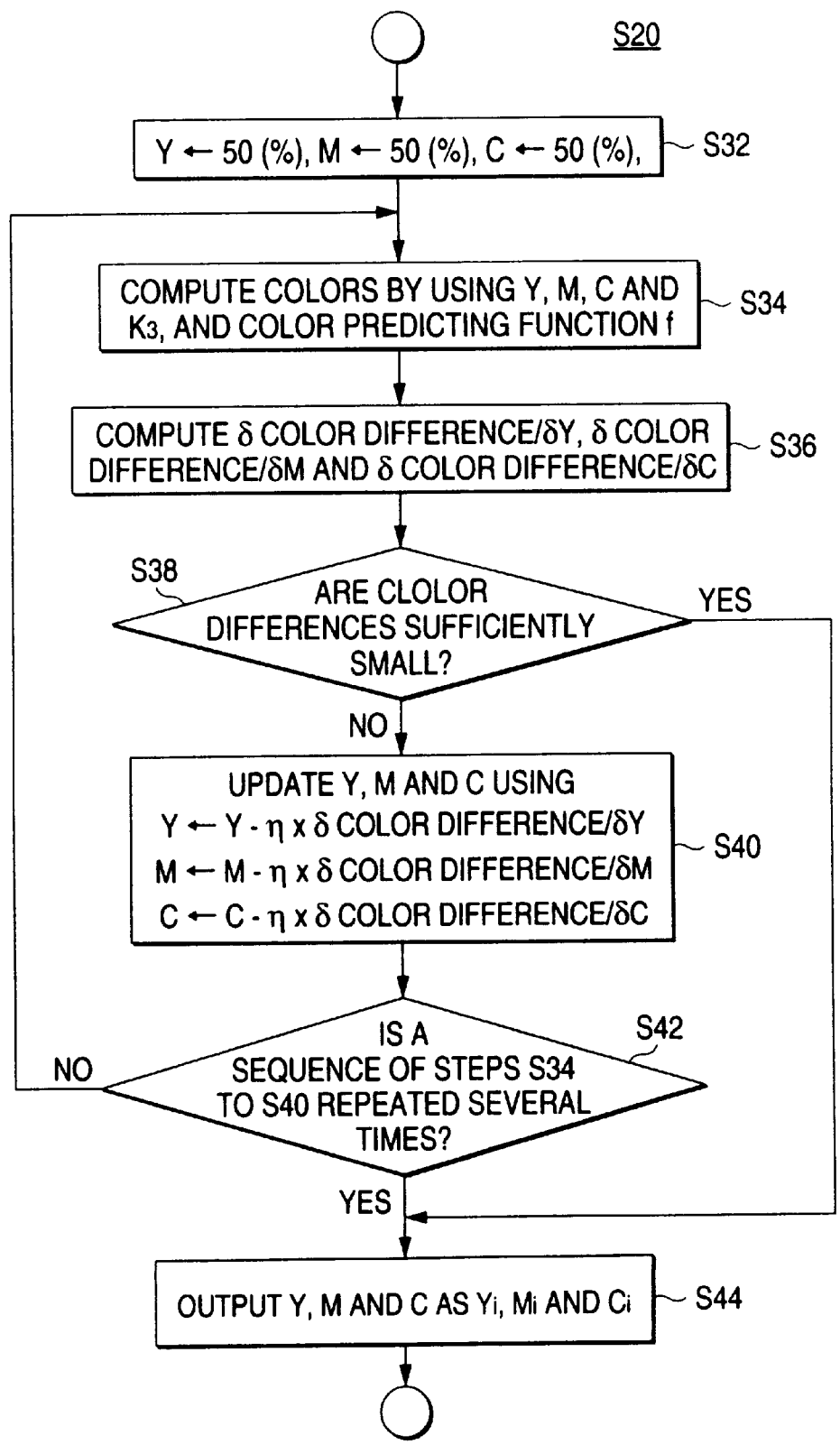
FIG. 3 is a flow chart showing the details of step S20 in FIG. 2.

FIG. 3 is a flow chart showing the details of step S20 in FIG. 2. Firstly, the colors Y, M, C are set to 50% (step S32), and colors are computed by using the resultant colors and a color predicting function f (step S34). Secondly, a color difference between the target color and the computed color is partially differentiated for each of the colors Y, M, C (step S36). If the color differences are sufficiently small (step S38), a step S44 is executed, and the color signals Y, M, C are produced. Here, the process of the step S20 in FIG. 2 ends.

If the color differences are not sufficiently small (step S38), the colors Y, M, C are updated. To the updating of the colors, the partially differentiated values of the individual color differences are multiplied by a proper coefficient ρ, and the results are subtracted from the colors Y, M, C, respectively. The coefficient ρ may be a fixed value or becomes smaller as it approaches to the target value. The values of the colors Y, M, C that are obtained by repeating a sequence of the steps S34 to S40 (step S42) are output as the values of the colors Yi, Mi, Ci, and here the process ends.

The second maximum black quantity computing means 18 computes a maximum quantity of black maxKo of each of the output color signals Co, Mo, Yo, Ko by using the calorimetric values L*, a*, b*. In the operation of the second maximum black quantity computing means 18, colors Co, Mo, Yo, Ko are used in place of the color signals Ci, Mi, Yi in the steps S20, S22 and S44 in the flow charts shown in FIGS. 2 and 3. Further, a function based on the color signals Co, Mo, Yo, Ko is used for the function f in FIG. 3. The others in the operation are the same as shown in FIGS. 2 and 3.

(Second Embodiment)

Figure 4:
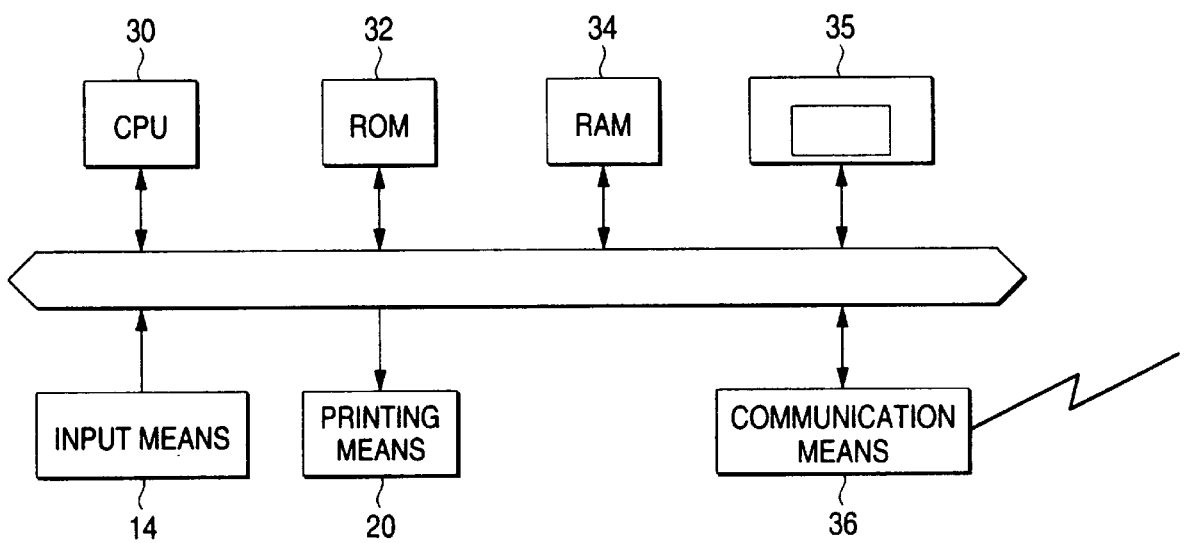
FIG. 4 is a block diagram showing a second embodiment of the present invention.

FIG. 4 is a block diagram showing a second embodiment of the present invention. The same portions as of the first embodiment will not be referred to while being designated by like reference numerals. In FIG. 4, a RAM 34 stores work data of a CPU 30 and image data. A communication means 36 transmits color signals L*, a*, b* and a black ratio g to and from other devices. The CPU 30 reads color signals Ci, Mi, Yi, Ki or colorimetric values L*, a*, b* from a recording medium 35 or colors Co, Mo, Yo, Ko or colorimetric values L*, a*, b* into the same.

Figure 5:
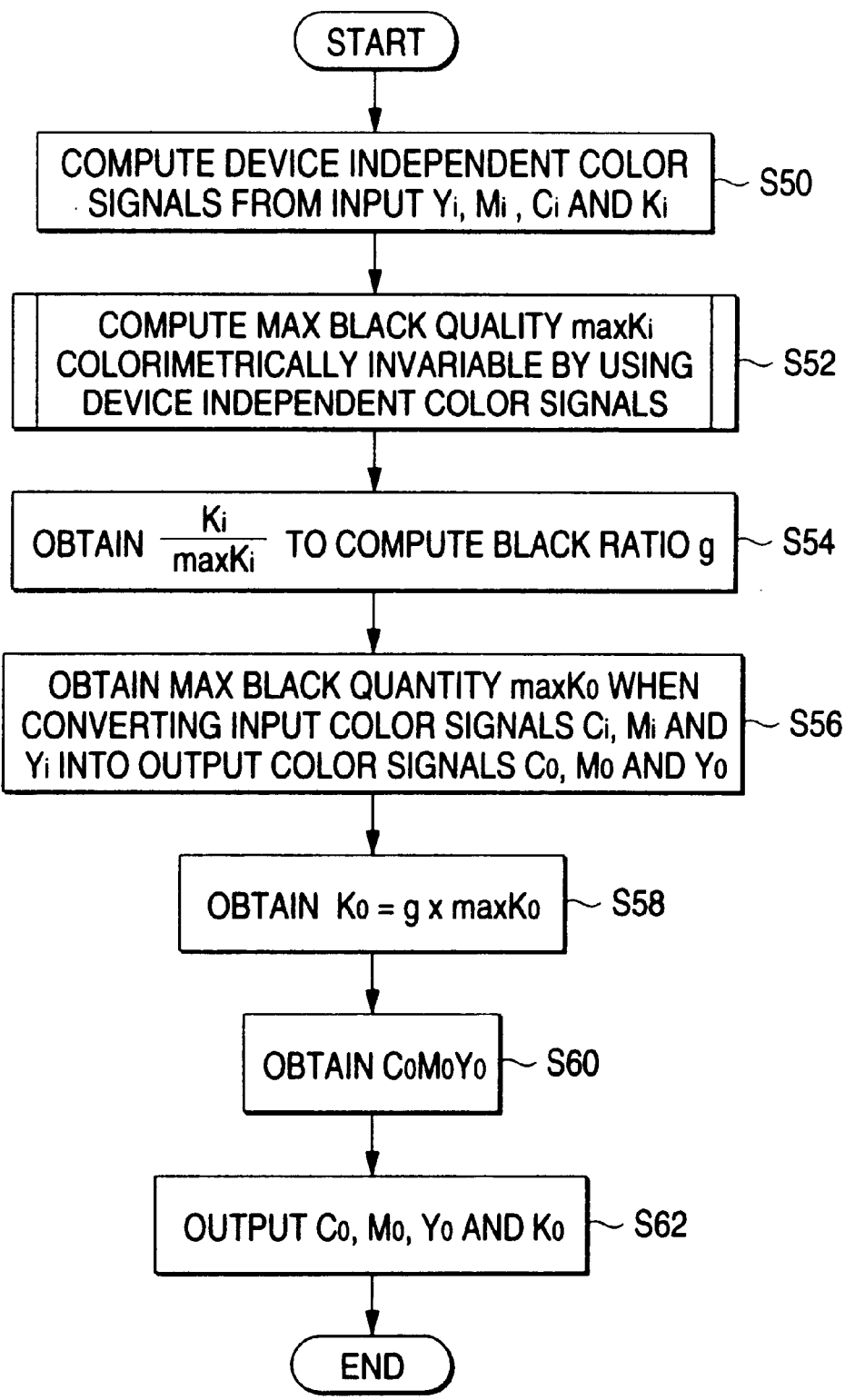
FIG. 5 is a flow chart showing an operation of the CPU 30 in FIG. 4.

FIG. 5 is a flow chart showing an operation of the CPU 30. In the present embodiment, the CPU 30 converts color signals Ci, Mi, Yi, Ki into output colors Co, Mo, Yo, Ko in accordance with instructions stored in a ROM 32. In FIG. 4, the CPU 30 converts input color signals Ci, Mi, Yi, Ki to color signals L*, a*, b* that are independent of the characteristics of the device (step S50).

The CPU computes a maximum quantity maxKi of black that is colorimetrically invariable by using device independent color signals (step S52). The details of the step S52 are as shown in FIG. 2. The CPU divides an input black quantity Ki by the maximum black quantity maxKi to obtain a black ratio g (step S54). When an image is transmitted to another device as in a facsimile device, color signals L*, a*, b* and the black ratio g are transmitted thereto by using the communication means 36.

When an image is printed by the color image processing device of the present embodiment, the CPU computes a maximum quantity maxKo of black of the output colors Co, Mo, Yo, Ko, which are formed by converting input color signals Ci, Mi, Yi, Ki by using the color signals L*, a*, b* (step S56). The CPU multiplies the black ratio g by the maximum black quantity maxKo to obtain an output black quantity Ko (step S58). Further, the CPU computes output color signals Co, Mo, Yo, Ko by using the black quantity Ko and the color signals L*, a*, b* (step S60) and outputs the color signals colors Co, Mo, Yo, Ko (step S62). The color signals L*, a*, b* and the black ratio g may be output by the communication means 36.

The instructions for executing a sequence of the steps S50 to S62 may be stored in the recording medium 35, and when these steps are executed, the instructions are read out therefrom and stored into the RAM 34.

(Third Embodiment)

Figure 6:
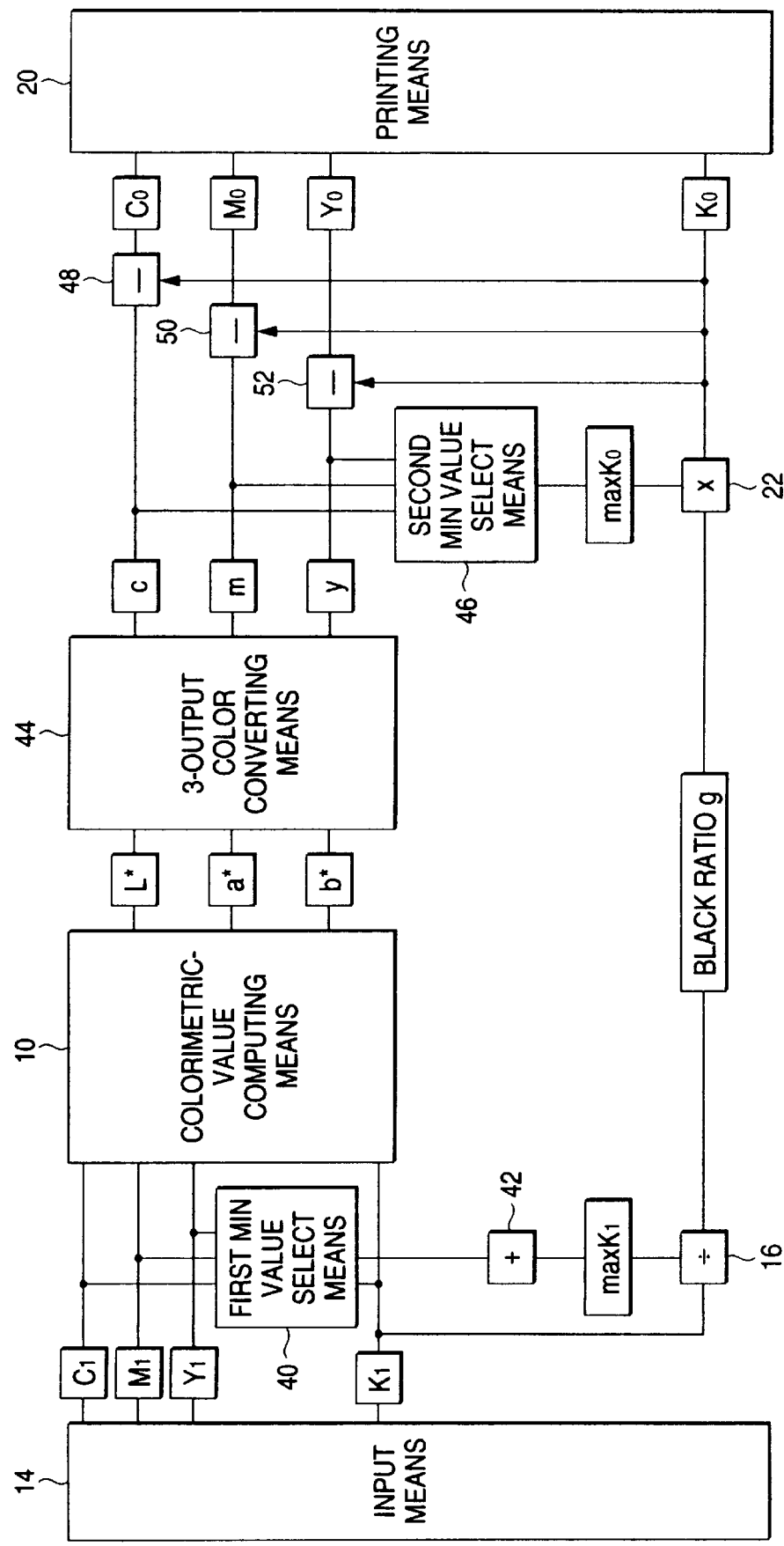
FIG. 6 is a block diagram showing a third embodiment of the present invention.

FIG. 6 is a block diagram showing a third embodiment of the present invention. In the figure, the same portions as in FIG. 1 are designated by like reference numerals and no further description of them will be given. A colorimetric-value computing means 10 converts input color signals Ci, Mi, Yi and Ki to colorimetric values by using Neugebauer expression. CIE L*, a*, b* are used for the colorimetric values. A first minimum value select means 40 obtains a minimum value min(Ci, Mi, Yi) of the input color signals Ci, Mi, Yi, Ki. An adder means 42 adds a black quantity Ki to the minimum value min(Ci, Mi, Yi) to produce a maximum quantity maxKi of black.

$$\max Ki = \min(Ci, Mi, Yi) + Ki \quad (1)$$

A dividing means 16 divides the black quantity Ki by the maximum black quantity maxKi to produce a black ratio g.

$$g = Ki/\max Ki \quad (2)$$

A 3-output color converting means 44 converts the colorimetric values L*, a*, b* to three color signals c, m, y in an output color space by Neugebauer equation. A second minimum value select means 46 selects a minimum value from among the values of the color signals c, m, y, and produces it as a maximum quantity maxKo of black.

$$\max Ko = \min(c, m, y) \quad (3)$$

A multiplying means 22 multiplies a black ratio g by the maximum black quantity Ko to produce a black quantity Ko in the output color space. Subtracting means 48, 50 and 52 subtract the black quantity Ko from the values of the color signals c, m, y to produce the colors Co, Mo, Yo in the output color space.

$$Ko = g \cdot \max Ko \quad (4)$$

$$Co = c - Ko$$

$$Mo = m - Ko$$

$$Yo = y - Ko$$

The color converting means of the present invention is capable of converting different input color signals in a 4-color space into color signals of which the colorimetric values and the black ratio g are equal to the corresponding ones of the input color signals.

(Fourth Embodiment)

The computing for the color conversion takes long time, as typically in the CCM. To avoid this, in the present invention, a part or the whole color conversion is computed in advance, and the results of the computation are stored in a 3-dimensional or 4-dimensional look-up table. In a color conversion, the look-up table is referred to.

Figure 7:
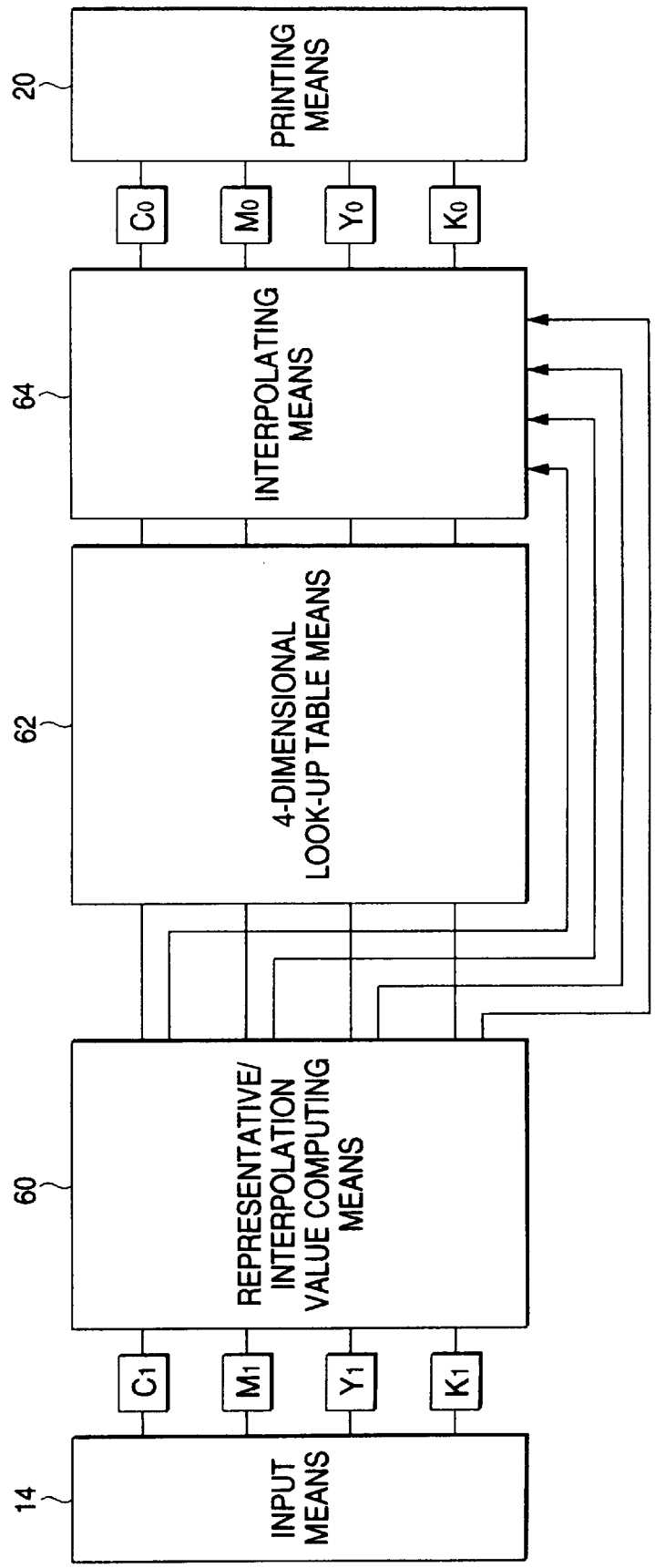
FIG. 7 is a block diagram showing a fourth embodiment of the present invention.

FIG. 7 is a block diagram showing a fourth embodiment of the present invention. Coordinate values in an output color space, of which the calorimetric values and a black ratio g are equal to those in lattice points in an input color space, are computed in advance, and stored in a 4-dimensional look-up table 62. Any of the computing methods referred to in the description of the first to third embodiments may be used for the computation of the coordinate values.

A representative/interpolation value computing means 60 separates the color signals Ci, Mi, Yi, Ki in the first CMYK coordinates into representatives and interpolation values each for each axis. The conversion values near to the color signals Ci, Mi, Yi, Ki are looked up in the 4-dimensional look-up table 62 by using the representatives. The conversion values thus looked up are interpolated for each axis by an interpolating means 64 by using the interpolation values gained from the input color signals, so that colors Co, Mo, Yo, Ko in the second CMYK coordinates are produced.

(Modifications)

Figure 8:
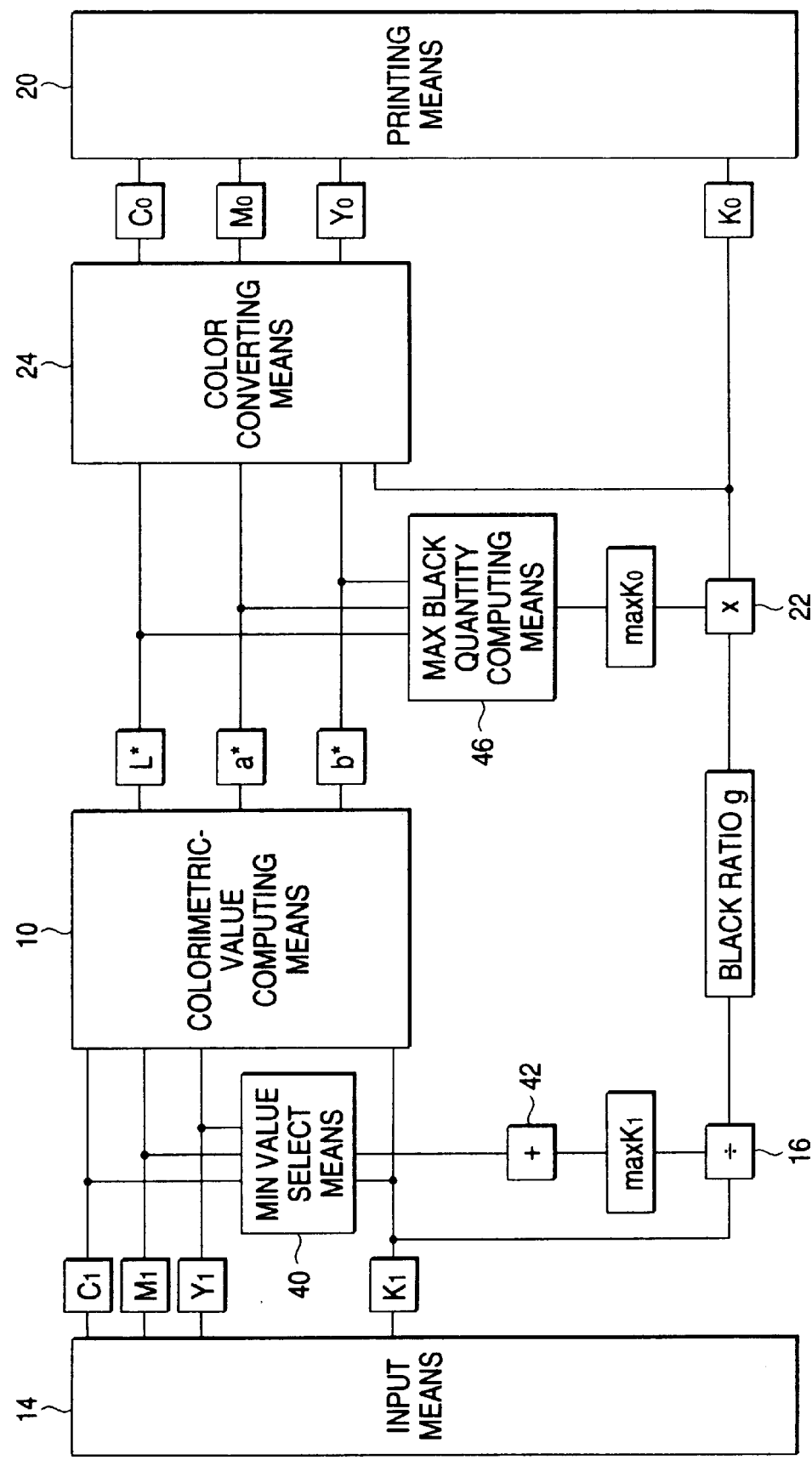
FIG. 8 is a block diagram showing another embodiment of the present invention.

An example where the means for computing the calorimetric values L*, a*, b* and the black ratio g from the color signals Ci, Mi, Yi, Ki in the third embodiment is combined with the means for computing the colors Co, Mo, Yo, Ko from the calorimetric values L*, a*, b* and the black ratio g in the first embodiment, is shown in FIG. 8. Thus, the means for computing the calorimetric values L*, a*, b* and the black ratio g from the color signals Ci, Mi, Yi, Ki in any of the first to third embodiments may be combined with the means for computing the colors Co, Mo, Yo, Ko from the calorimetric values L*, a*, b* and the black ratio g in another embodiment.

While the CIE L*, a*, b* color signals are used for the calorimetric values in the above-mentioned embodiments, the color signals in another color space, for example, R, G and B color signals, may be used instead.

The following inventions are also disclosed in the present Patent Application.

1. A color facsimile device comprising:
   input means for inputting color signals Ci, Mi, Yi, Ki in first CMYK coordinates;
   converting means for converting the color signals Ci, Mi, Yi, Ki received from the input means into device independent color signals in calorimetric coordinates;
   computing means for computing a black ratio g from the color signals Ci, Mi, Yi, Ki received from the input means; and
   means for transmitting the device independent color signals from the converting means and the black ratio g from the computing means.

2. A color facsimile device comprising:
   receiving means for receiving device independent color signals in color coordinates and a black ratio g when the device independent color signals are printed;
   means for computing color signals Co, Mo, Yo, Ko in CMYK coordinates using the device independent color signals and the black ratio g, which are received by the receiving means; and
   printing means for printing an image in accordance with the color signals Co, Mo, Yo, Ko.

3. A recording medium comprising:
   an input instruction for instructing a CPU to input color signals Ci, Mi, Yi, Ki in first CMYK coordinates;
   a converting instruction for instructing the CPU to convert the color signals Ci, Mi, Yi, Ki that are input in response to the input instruction into device independent color signals in color coordinates;
   a computing instruction for instructing the CPU to compute a black ratio g using the color signals Ci, Mi, Yi, Ki that are input in response to the input instruction; and
   an instruction for instructing the CPU to send the device independent color signals that are converted in response to the converting instruction and the black ratio g that is computed in response to the computing instruction.

4. A recording medium comprising:
   an receiving instruction for instructing a CPU to receive device independent color signals in color coordinates and a black ratio g when the device independent color signals are printed;
   an instruction for instructing The CPU to compute color signals Co, Mo, Yo, Ko in CMYK coordinates using the device independent color signals and the black ratio g, which are received in response to the receiving instruction; and
   printing instruction for instructing the CPU to print an image in accordance with the color signals Co, Mo, Yo, Ko.

While the present invention has been made using some specific embodiments, it should be understood that the invention is not limited to the above-mentioned embodiments, but it may variously be changed, modified, and altered within its spirit and scope as set out in the appended claims.

As seen from the foregoing description, when the color signals in color coordinates are converted into corresponding color signals in another color coordinates, a black ratio in an original image is kept invariable.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A color image processing method, comprising the steps of:
   computing device independent color signals in color coordinates of the colorimetric system using input color signals Ci, Mi, Yi, Ki in first CMYK coordinates;
   computing a maximum quantity of black maxKi of the color signals Ci, Mi, Yi, Ki using one of said input color signals Ci, Mi, Yi, Ki and said device independent color signals;
   computing a black ratio g of the color signals Ci, Mi, Yi, Ki using said maximum black quantity maxKi and said input color signal Ki;
   computing a maximum black quantity maxKo using one of the device independent color signals and color signals in second CMYK coordinates; and
   generating an image based on said device independent color signals, maxKo and said black ratio.

2. The color image processing method according to claim 1, wherein said maximum black quantity maxKi is determined by a minimum value of said input color signals Ci, Mi, Yi, Ki and said input color signal Ki.

3. The color image processing method according to claim 1, wherein said maximum black quantity maxKi represents a maximum quantity of black that is obtained by computing the maximum value of black which secures the device independent color coordinates.

4. A color image processing method comprising the steps of:
   determining device independent color signals using input color signals Ci, Mi, Yi, Ki;
   computing a maximum black quantity maxKo that is obtained by computing the maximum value of black which secures a device independent color coordinate, using the device independent color signals in color coordinates of a calorimetric system;
   recognizing a black ratio g associated with the device independent color signals and that is not based on maxKo;
   determining a color signal Ko in CMYK coordinates using said maximum black quantity maxKo and said black ratio g;
   determining the color signals Co, Mo, Yo, Ko in CMYK coordinates using the device independent color signals and the color signal Ko; and
   generating an image based on said color signals Co, Mo, Yo, Ko.

5. The color image processing method according to claim 4, wherein said black ratio g is determined by a maximum black quantity maxKi computed by using said input color signals Ci, Mi, Yi, Ki and said input color signal Ki.

6. The color image processing method according to claim 5, wherein said maximum black quantity maxKi is determined by a minimum value of said input color signals Ci, Mi, Yi and said input color signal Ki.

7. The color image processing method according to claim 5, in which said black ratio g is determined by dividing said color signal Ki by the maximum black quantity maxKi computed by using said input color signals Ci, Mi, Yi, Ki.

8. The color image processing method according to claim 4, in which said black ratio g is determined by said maximum black quantity maxKi that is obtained by computing the maximum value of black which secures the device independent color coordinates, and said input color signal Ki.

9. The color image processing method according to claim 8, in which said black ratio g is determined by dividing said color input signal Ki by said maximum black quantity maxKi that is obtained by computing the maximum value of black which secures the device independent color coordinates.

10. A color image processing apparatus for converting input color signals Ci, Mi, Yi, Ki in first CMYK coordinates to color signals Co, Mo, Yo, Ko in second CMYK coordinates, comprising:
    first computing means for computing device independent color signals in color coordinates of a colorimetric system using said input color signals Ci, Mi, Yi, Ki in first CMYK coordinates;
    second computing means for computing a black value g using said input color signals Ci, Mi, Yi, Ki;
    third computing means for computing a maximum black quantity maxKo based on said device independent color signals, the maxKo not being used to compute the black value g; and
    color converting means for converting said device independent color signals output from said first computing means into said color signals Co, Mo, Yo, Ko in the second CMYK coordinates based on the maxKo and the black value g while keeping invariable the black value g output from said second computing means.

11. The color image processing apparatus according to claim 10, in which said second computing means computes said black ratio g using the maximum black quantity maxKi based on said input color signals Ci, Mi, Yi, Ki and said input color signal Ki.

12. The color image processing apparatus according to claim 11, in which said second computing means determines said maximum black quantity maxKi by a minimum value of said input color signals Ci, Mi, Yi, Ki and said input color signal Ki.

13. A color image processing apparatus for converting input color signals Ci, Mi, Yi, Ki in first CMYK coordinates to color signals Co, Mo, Yo, Ko in second CMYK coordinates, comprising:
    first computing means for computing device independent color signals in color coordinates of a colorimetric system using said input color signals Ci, Mi, Yi, Ki in first CMYK coordinates;
    second computing means for computing a black value g by using said input color signal Ki and said device independent color signals;
    third computing means for computing a maximum black quantity maxKo based on said device independent color signals, the maxKo not being used to compute the black value g; and color converting means for converting said device independent color signals in the color coordinates while keeping of a colorimetric system that are output from said first computing means into said color signals Co, Mo, Yo, Ko in second CMYK coordinates based on the maxKo and the black value g while keeping invariable the black value g output from said computing means.

14. The color image processing apparatus according to claim 13, wherein said second computing means computes said black ratio g by using said maximum black quantity maxKi that is obtained by computing the maximum value of black which secures the device independent color coordinates, and said input color signal Ki.

15. The color image processing apparatus according to claim 14, wherein said second computing means computes said black ratio g by dividing said input color signal Ki by said maximum black quantity maxKi that is obtained by computing the maximum value of black which secures the device independent color coordinates.

16. A color signal processing apparatus comprising:

colorimetric-value computing means for computing calorimetric values using input color signals Ci, Mi, Yi, Ki;

black-ratio computing means for computing a black value g using said input color signals Ci, Mi, Yi, Ki;

maximum black-quantity computing means for computing a maximum quantity of black maxKo that is obtained by computing the maximum value of black which secures the device independent color coordinates in second CMYK coordinates by using said calorimetric values and the maxKo not being used to determine said black value g;

multiplying means for computing a color signal Ko by multiplying said maximum black quantity maxKo by said black value g; and computing means for computing said color signals Co, Mo, Yo, Ko by using said calorimetric values and said color signal Ko.

17. An image processing apparatus comprising:

colorimetric-value computing means for computing calorimetric values by using input color signals Ci, Mi, Yi, Ki; and black value computing means for computing a black value g by using said input color signals Ci, Mi, Yi, Ki;

said computed colorimetric values and said computed black value g being output;

maximum black quantity generating means that generates a maximum black quantity maxKo based on said calorimetric values the maxKo not being used to generate said black value g; and generating means for generating an image based on said colorimetric values, the maxKo and said black value.

18. An image processing apparatus comprising:

receiving means for receiving calorimetric values and a black value g;

maximum black-quantity computing means for computing a maximum black quantity that is obtained by computing the maximum value of black which secures the device independent color coordinates and the maximum black quantity not being used to determine said black value g;

multiplying means for computing a color signal Ko by multiplying said maximum black quantity by said black value g;

computing means for computing color signals Co, Mo, Yo, Ko by using said colorimetric values and said color signal Ko; and generating an image based on said color signals Co, Mo, Yo, Ko.

19. A color facsimile device comprising:

input means for inputting color signals Ci, Mi, Yi, Ki in first CMYK coordinates;

converting means for converting said input color signals Ci, Mi, Yi, Ki received from said input means into device independent color signals in colorimetric coordinates;

computing means for computing a black value g from said color signal Ci, Mi, Yi, Ki received from said input means and for computing a maximum black quantity maxKo based on the device independent color signals the maxKo not being used to generate said black value g; and means for transmitting said device independent color signals from said converting means, said maximum black quantity maxKo and said black value g from said computing means.

20. A color facsimile device comprising:

first computing means for computing device independent color signals in color coordinates of a calorimetric system using input color signals Ci, Mi, Yi, Ki in first CMYK coordinates;

black value computing means for computing a black value g using said input color signals Ci, Mi, Yi, Ki;

maximum black quantity generating means for generating a maximum black quantity based on said device independent color signals, the maximum black quantity not being used to compute said black value g;

receiving means for receiving said device independent color signals in color coordinates, said maximum black quantity and said black value g when said device independent color signals are printed;

means for computing color signals Co, Mo, Yo, Ko in CMYK coordinates using said device independent color signals, said maximum black quantity and said black value g, which are received by said receiving means; and printing means for printing an image in accordance with said color signals Co, Mo, Yo, Ko.

21. A recording medium on which is recorded a control program for controlling a CPU, the control program including instructions for causing the CPU to:

input color signals Ci, Mi, Yi, Ki in first CMYK coordinates;

convert said color signals Ci, Mi, Yi, Ki that are input in response to said input instruction into device independent color signals in color coordinates;

compute a black value g using said color signals Ci, Mi, Yi, Ki that are input in response to said input instruction;

compute a maximum black quantity based on the device independent color signals, the maximum black quantity not being used to compute said black value g; and send said device independent color signals that are converted in response to said converting instruction and said maximum black quantity and black value g.

22. A recording medium on which is recorded a control program for controlling a CPU, the control program including instructions for causing the CPU to:

input color signals Ci, Mi, Yi, Ki in first CMYK coordinates;

convert said input color signals Ci, Mi, Yi, Ki into device independent color signals in color coordinates;

compute a black value g using said input color signals Ci, Mi, Yi, Ki;

compute a maximum black quantity based on the device independent color signals, the maximum black quantity not being used to compute said black value g;

receive said device independent color signals in color coordinates and said black value g when said independent color signals are printed;

compute color signals Co, Mo, Yo, Ko in CMYK coordinates using said device independent color signals, said maximum black quantity and said black value g; and print an image in accordance with said color signals Co, Mo, Yo, Ko.

* * * * *